(12) United States Patent
Sakai

(10) Patent No.: US 9,060,261 B2
(45) Date of Patent: Jun. 16, 2015

(54) COMMUNICATION APPARATUS, COMMUNICATION METHOD, AND PROGRAM

(75) Inventor: Tatsuhiko Sakai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/502,437

(22) PCT Filed: Oct. 6, 2010

(86) PCT No.: PCT/JP2010/005980
§ 371 (c)(1),
(2), (4) Date: Apr. 17, 2012

(87) PCT Pub. No.: WO2011/048759
PCT Pub. Date: Apr. 28, 2011

(65) Prior Publication Data
US 2012/0202464 A1    Aug. 9, 2012

(30) Foreign Application Priority Data

Oct. 21, 2009    (JP) .................................. 2009-242635

(51) Int. Cl.
*H04M 1/66*    (2006.01)
*H04W 8/22*    (2009.01)
(Continued)

(52) U.S. Cl.
CPC ............ *H04W 8/22* (2013.01); *H04M 1/72519* (2013.01); *H04W 8/24* (2013.01)

(58) Field of Classification Search
CPC ............ G06F 2221/2129; G06F 21/31; G06Q 20/4012; G07C 9/00031; H04L 2209/805; H04L 63/0492; H04L 63/08; H04W 12/06

USPC .......................................................... 455/411
See application file for complete search history.

(56) References Cited

U.S. PATENT DOCUMENTS 7,715,873 B1 *    5/2010    Biere et al. .................... 455/557
2002/0147819 A1 *  10/2002  Miyakoshi et al. ........... 709/228
(Continued)

FOREIGN PATENT DOCUMENTS

CN    101527911 A    9/2009
CN    101534505 A    9/2009
(Continued)

OTHER PUBLICATIONS

Wi-Fi Certified TM for Wi-Fi Protected Setup: Easing the User Experience for Home and Small Office Wi-Fi (registered trademark) Networks; 2007, 2008 Wi-Fi Alliance; pp. 1-14.

*Primary Examiner* — Olumide T Ajibade Akonai
*Assistant Examiner* — Edward Zhang
(74) *Attorney, Agent, or Firm* — Canon USA, Inc. IP Division

(57) ABSTRACT

The present invention relates to a communication apparatus that is capable of performing a setting process to share a communication parameter with a communication partner apparatus in multiple setting modes and that is capable of automatically determining the setting mode in which the setting process is performed. The communication apparatus confirms the type of a user interface of the communication partner apparatus and determines the setting mode of the setting process to share the communication parameter with the communication partner apparatus on the basis of the confirmed type of the user interface of the communication partner apparatus and the type of a user interface of the communication apparatus to share the communication parameter with the communication partner apparatus.

10 Claims, 7 Drawing Sheets

(51) Int. Cl.
*H04M 1/725* (2006.01)
*H04W 8/24* (2009.01)

(56) References Cited

U.S. PATENT DOCUMENTS

| | | | |
|---|---|---|---|
| 2005/0091332 A1* | 4/2005 | Moro et al. | 709/208 |
| 2005/0163087 A1* | 7/2005 | Ianos | 370/338 |
| 2005/0190769 A1* | 9/2005 | Smith | 370/395.2 |
| 2007/0106897 A1* | 5/2007 | Kulakowski | 713/171 |
| 2008/0026795 A1 | 1/2008 | Fujii | |
| 2008/0057890 A1* | 3/2008 | McKillop et al. | 455/185.1 |
| 2009/0055649 A1* | 2/2009 | Takata et al. | 713/171 |
| 2009/0279526 A1 | 11/2009 | Ichikawa | |
| 2012/0328096 A1* | 12/2012 | Shah et al. | 380/33 |

FOREIGN PATENT DOCUMENTS

| | | |
|---|---|---|
| JP | 2006-309458 A | 11/2006 |
| JP | 2006-311138 A | 11/2006 |
| JP | 2006-352282 A | 12/2006 |
| JP | 2008-035126 A | 2/2008 |
| JP | 2008-072577 A | 3/2008 |
| JP | 2008-205567 A | 9/2008 |
| JP | 2008-283422 A | 11/2008 |
| WO | 2008/099849 A1 | 8/2008 |

* cited by examiner

COMMUNICATION APPARATUS, COMMUNICATION METHOD, AND PROGRAM

TECHNICAL FIELD

The present invention relates to a communication apparatus, a communication method for the communication apparatus, and a program.

BACKGROUND ART

There are many setting items that should be set before use in wireless communication typified by wireless local area network (LAN) conforming to Institute of Electrical and Electronics Engineers (IEEE) 802.11 series standard. For example, the setting items include communication parameters, such a Service Set Identifier (SSID) used as a network identifier, an encryption method, an encryption key, an authentication method, and an authentication key, which are necessary for the wireless communication. It is very complicated for a user to manually set the setting items.

In such a situation, various manufacturers have proposed automatic setting methods for easily setting the communication parameters in wireless devices. In the automatic setting methods, the communication parameters are provided from one device to the other device with procedures that are set in advance between the devices and messages to automatically set the communication parameters. Non Patent Literature 1 discloses an example of automatic setting of communication parameters in communication in a wireless LAN infrastructure mode (infrastructure communication). Patent Literatures 1 to 3 disclose examples of automatic setting of communication parameters in communication in a wireless LAN ad hoc mode (ad hoc communication). Technologies to select a device (providing apparatus) that provides the communication parameters from the devices participating in a network to provide the communication parameters from the providing apparatus to another device (receiving apparatus) are described in Patent Literatures 1 to 3.

The communication parameters may be automatically set in a mode in which a user inputs an authentication code in a device (hereinafter referred to as an authentication code mode) (refer to Non Patent Literature 1). In the authentication code mode, the authentication code is shared between devices to perform an authentication process between the devices and a setting process of the communication parameters is performed between the devices for which the authentication process succeeded. The communication parameters may be automatically set in a mode in which the setting process is started in response to pressing of a setting start button provided in a device and the automatic setting of the communication parameters is performed with another device in which the setting process is similarly started (hereinafter referred to as a button pressing mode) (refer to Non Patent Literature 1). In the button pressing mode, the setting process of the communication parameters is performed between the devices without the authentication code that is input by the user.

CITATION LIST

Patent Literature

PTL 1: Japanese Patent Laid-Open No. 2006-352282
PTL 2: Japanese Patent Laid-Open No. 2006-311138
PTL 3: Japanese Patent Laid-Open No. 2006-309458

Non Patent Literature

NPL 1: Wi-Fi CERTIFIED™ for Wi-Fi Protected Setup: Easing the User Experience for Home and Small Office Wi-Fi (registered trademark) Networks, http://www.wi-fi.org/wp/wifi-protected-setup

SUMMARY OF INVENTION

Technical Problem

In the authentication code mode, one device that performs the automatic setting of the communication parameters may notify the user of an authentication code, for example, by displaying the authentication code in a display device and the user may input the authentication code notified from the one device into the other device (device specifying method). Alternatively, the user may specify an authentication code and may input the specified authentication code into both the devices (user specifying method). With these methods, the authentication code is shared between the devices. In other words, it is necessary for at least one device to include a user interface through which the authentication code is input in order to perform the authentication code mode.

However, some devices that automatically set the communication parameters are provided with only the setting start button and have no user interface through which the authentication code is input. Since it is not possible to automatically set the communication parameters in the authentication code mode between the devices that have no user interface through which the authentication code is input, it is necessary to automatically set the communication parameters in the button pressing mode between such devices.

As described above, with the methods of automatically setting the communication parameters in related art, it is necessary for the user to select either the authentication code mode or the button pressing mode in accordance with the user interface included in the device. Accordingly, the methods are not user-friendly. In addition, if the user incorrectly selects the mode, it is not possible to set the communication parameters.

The present invention provides a communication apparatus capable of selecting a setting mode of a setting process to share the communication parameters with a communication partner apparatus in accordance with a user interface included in the apparatus. Further features and advantages of the present invention will become apparent from the following description of exemplary embodiments with reference to the attached drawings.

Solution to Problem

A communication apparatus according to an embodiment of the present invention confirms the type of a user interface of a communication partner apparatus and determines a setting mode of a setting process to share a communication parameter with the communication partner apparatus on the basis of the confirmed type of the user interface of the communication partner apparatus and the type of a user interface of the communication apparatus to share the communication parameter with the communication partner apparatus.

DESCRIPTION OF EMBODIMENTS

A communication apparatus according to an embodiment of the present invention will herein be described in detail with reference to the attached drawings. Although a wireless LAN system conforming to the IEEE 802.11 series is exemplified below, the communication mode is not necessarily limited to the wireless LAN conforming to the IEEE 802.11 series.

Figure 1:
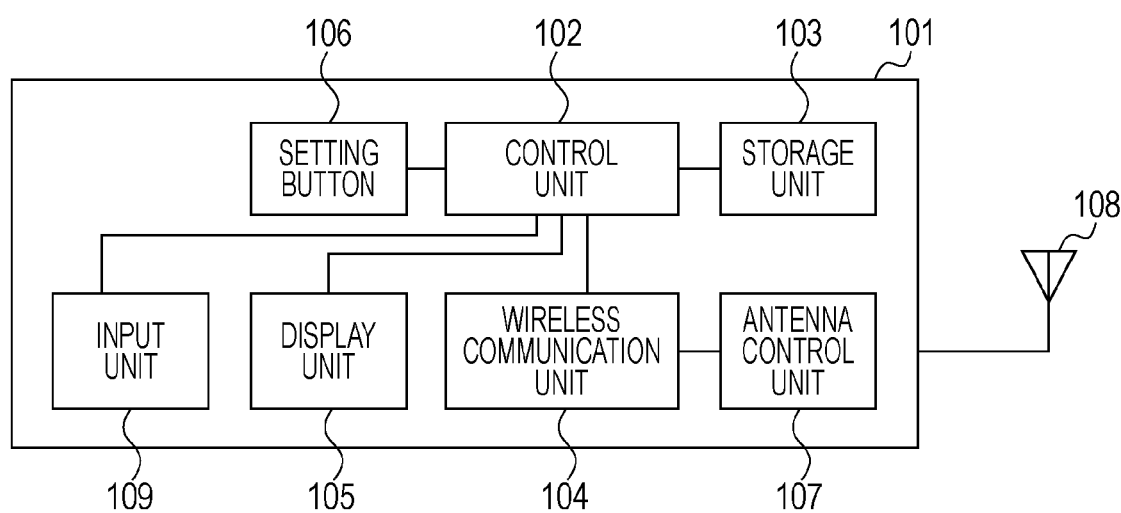
FIG. 1 is a block diagram showing an example of the hardware configuration of an apparatus according to an embodiment of the present invention.

The hardware configuration in the present embodiment will now be described. FIG. 1 is a block diagram showing an example of the hardware configuration of each apparatus described below. Referring to FIG. 1, an apparatus 101 includes a control unit 102 that is a computer, such as a central processing unit (CPU) or a microprocessor unit (MPU), and that executes a control program stored in a storage unit 103 to control the entire apparatus. The control unit 102 controls automatic setting of communication parameters with another apparatus. The storage unit 103 stores the control computer program executed by the control unit 102 and a variety of information, such as the communication parameters. Various operations described below are performed by the control unit 102 that executes the control program stored in the storage unit 103. The storage unit 103 is, for example, a memory, such as a read only memory (ROM) or a random access memory (RAM), a flexible disk, a hard disk, an optical disc, a magneto-optical disk, a compact disc-read only memory (CD-ROM), a compact disc-recordable (CD-R), a magnetic tape, a non-volatile memory card, or a digital versatile disk (DVD).

The apparatus 101 also includes a wireless communication unit 104, a display unit 105, a setting button 106, an antenna control unit 107, an antenna 108, and an input unit 109. The wireless communication unit 104 performs wireless communication. The display unit 105 performs a variety of display. The display unit 105 has a function of outputting information that can be visually recognized, as of a liquid crystal display (LCD) or a light emitting diode (LED), and may have an audio output function, as of a speaker. The setting button 106 is used to provide a trigger to start the setting process of the communication parameters in the button pressing mode. The input unit 109 is used by a user to input various items. The input unit 109 has a function of providing a trigger to start the setting process of the communication parameters in the authentication code mode. The user operates the input unit 109 to input an authentication code. Although the display unit 105, the setting button 106 and the input unit 109 are shown as part of the configuration of the apparatus in FIG. 1, any of these components may be removed from the configuration of the apparatus. In the present embodiment, a setting mode of the communication parameters is automatically selected on the basis of whether the apparatus includes the display unit 105, the setting button 106, and/or the input unit 109. In the automatic setting of the communication parameters, an apparatus (providing apparatus) that provides the communication parameters and an apparatus (receiving apparatus) that receives the communication parameters from the receiving apparatus are determined and the communication parameters are provided from the providing apparatus to the receiving apparatus. The communication parameters are automatically set in the authentication code mode or in the button pressing mode. In the authentication code mode, the authentication code is shared between apparatuses to perform an authentication process between the apparatuses and the setting process of the communication parameters is performed between the apparatuses for which the authentication process succeeded. The authentication code mode may be realized by a mode in which one apparatus notifies the user of the authentication code, for example, by displaying the authentication code in a display device and the user inputs the authentication code notified from the one apparatus into the other apparatus or a mode in which the user inputs the authentication code into both the apparatuses. In the button pressing mode, the setting button used by the user to instruct start of the automatic setting of the communication parameters is subjected to certain processing, for example, is pressed to start the setting process and the setting process of the communication parameters is performed with another apparatus in which the setting button is similarly operated.

Figure 2:
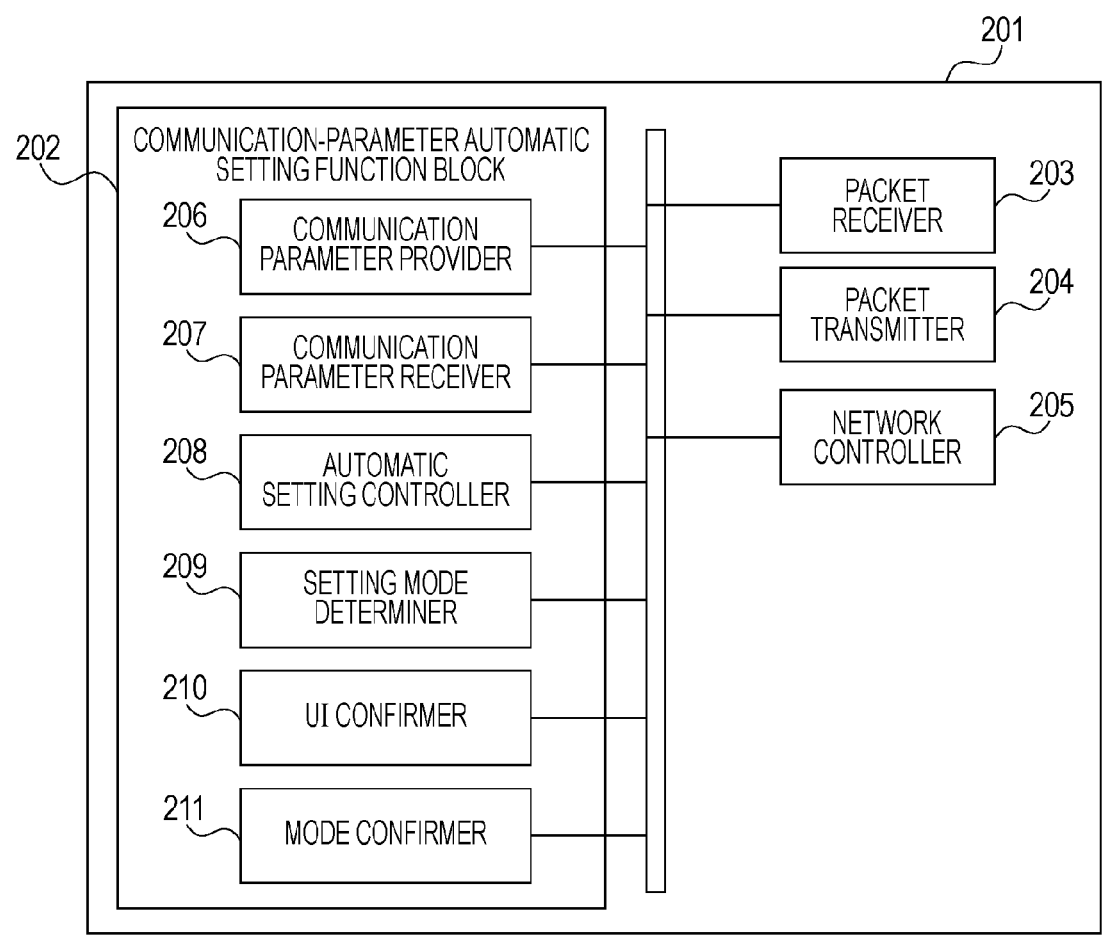
FIG. 2 is a block diagram showing an example of the functional configuration of software of an apparatus according to an embodiment of the present invention.

FIG. 2 is a block diagram showing an example of the functional configuration of software executed by an apparatus in communication-parameter automatic setting operations described below. Referring to FIG. 2, an apparatus 201 includes a communication-parameter automatic setting function block 202. In the present embodiment, the communication-parameter automatic setting function block 202 automatically sets the communication parameters, such an SSID used as a network identifier, an encryption method, an encryption key, an authentication method, and an authentication key, which are necessary for the wireless communication. The apparatus 201 also includes a packet receiver 203 that receives packets concerning a variety of communication. Reception of a beacon (notification signal) is performed by the packet receiver 203. A device search signal, such as a probe request, is also received by the packet receiver 203. The probe request is a search signal for searching for a desired network. Reception of a probe response, which is a search response signal to the probe request, is also performed by the packet receiver 203.

The apparatus 201 further includes a packet transmitter 204 that transmits the packets concerning the variety of communication. Transmission of the beacon is performed by the packet transmitter 204. Transmission of the probe request and transmission of the probe response, which is a response signal to the probe request, are also performed by the packet transmitter 204. A variety of information (self information) about a source apparatus is added to the search signal and the search response signal. The self information includes information with which an apparatus that has received the self information can determine whether the own apparatus is operating as the providing apparatus or the receiving apparatus. The self information also includes information (user interface (UI) information) indicating the type of a user interface (UI) included in the source apparatus. The UI information includes information indicating the presence of the display unit 105, the presence of the setting button 106, and the presence of the input unit 109. The self information further includes information (mode information) indicating which setting mode of the process of automatically setting the communication parameters the source apparatus is activating. The mode information includes information indicating whether the button pressing mode is being activated or the authentication code mode is being activated. When the authentication code mode is being activated, the mode information includes information indicating whether the source apparatus is operating as an input-side apparatus that inputs the authentication code or as a display-side apparatus that displays the authentication code. The apparatus 201 further includes a network controller 205 that controls network connection. Connection to a wireless LAN network, etc. is performed by the network controller 205.

The communication-parameter automatic setting function block 202 includes a communication parameter provider 206, a communication parameter receiver 207, an automatic setting controller 208, a setting mode determiner 209, a UI confirmer 210, and a mode confirmer 211. The communication parameter provider 206 provides the communication parameters to a communication partner apparatus when the own apparatus is operating as the providing apparatus. The communication parameter receiver 207 receives the communication parameters from the communication partner apparatus when the own apparatus is operating as the receiving apparatus. The automatic setting controller 208 controls various protocols in the automatic setting of the communication parameters. The process of automatically setting the communication parameters described below is performed under the control of the automatic setting controller 208. The setting mode determiner 209 determines the setting mode in the automatic setting of the communication parameters. The setting mode in the automatic setting of the communication parameters is determined on the basis of the result of confirmation by the UI confirmer 210 or the mode confirmer 211 in determination of the setting mode in the providing apparatus described below. The UI confirmer 210 confirms the received UI information to identify the user interface included in the communication partner apparatus. The mode confirmer 211 confirms the received mode information to identify the setting mode which the communication partner apparatus is activating.

Figure 3:
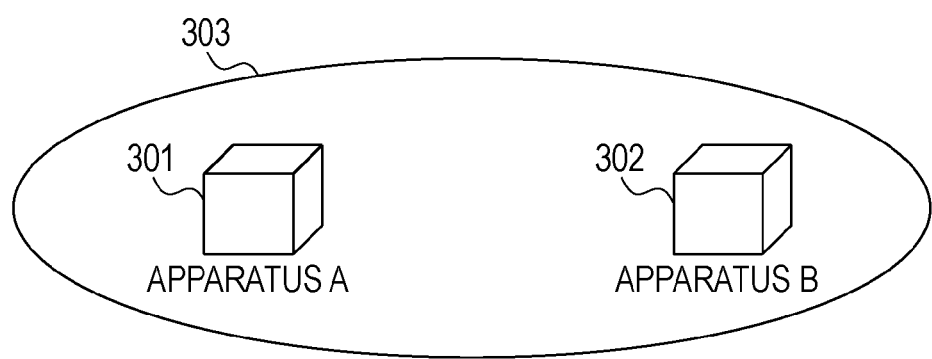
FIG. 3 is a diagram showing an exemplary network configuration according to an embodiment of the present invention.

FIG. 3 illustrates a providing apparatus A 301 (apparatus A) and a receiving apparatus B 302 (apparatus B). The apparatus A is the communication partner apparatus of the apparatus B and the apparatus B is the communication partner apparatus of the apparatus A. The apparatus A and the apparatus B perform a setting process to share the communication parameters with each other. The apparatus A and the apparatus B each have the hardware configuration and the software functional configuration described above with reference to FIGS. 1 and 2, respectively. The apparatus A and the apparatus B perform the process of automatically setting the communication parameters for the ad hoc communication in response to an instruction from the user and perform the communication over a network 303 to provide the communication parameters from the apparatus A to the apparatus B. Whether each apparatus functions as the providing apparatus or the receiving apparatus may be automatically determined between the apparatuses or may be specified by the user. Processes that are performed after the determination of whether each apparatus functions as the providing apparatus or the receiving apparatus will be described below.

Figure 4:
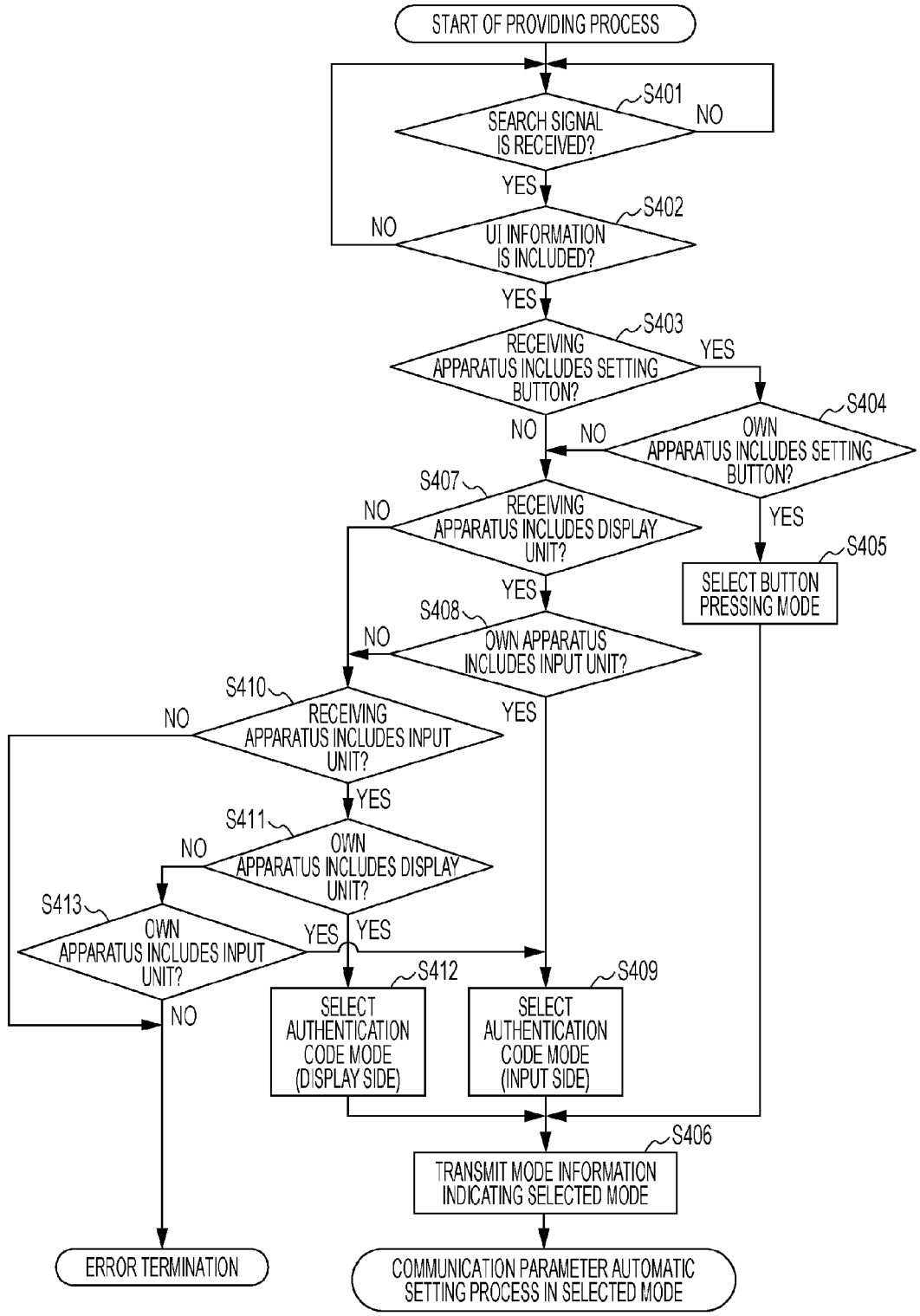
FIG. 4 is a flowchart showing an example of the operation of a providing apparatus according to an embodiment of the present invention.

FIG. 4 is a flowchart showing an example of a process of determining the setting mode for providing the communication parameters after the apparatus activates the process of automatically setting the communication parameters as the providing apparatus. The process of automatically setting the communication parameters may be activated in response to an operation with the setting button 106 or may be activated in response to an operation with the input unit 109. When the process of automatically setting the communication parameters is activated in response to an operation with the setting button 106, the providing apparatus determines in Step S404 described below that the own apparatus includes the setting button 106. When the process of automatically setting the communication parameters is activated in response to an operation with the input unit 109, the providing apparatus determines in Steps S408 and S413 described below that the own apparatus includes the input unit 109. The flowchart in FIG. 4 is performed by the control unit 102 that reads out the computer program stored in the storage unit 103 to execute the readout computer program.

Upon start of the operation as the providing apparatus, in Step S401, the control unit 102 (the automatic setting controller 208) determines whether the wireless communication unit 104 (the packet receiver 203) receives a search signal from the receiving apparatus. If the control unit 102 (the automatic setting controller 208) determines that the wireless communication unit 104 (the packet receiver 203) receives a search signal from the receiving apparatus, in Step S402, the control unit 102 (the automatic setting controller 208) determines whether the received search signal includes the UI information. If the control unit 102 (the automatic setting controller 208) determines that the received search signal includes the UI information, the UI confirmer 210 confirms the type of the UI of the receiving apparatus. In Step S403, the UI confirmer 210 confirms whether the receiving apparatus includes the setting button 106. If the UI confirmer 210 confirms that the receiving apparatus does not include the setting button 106, the process goes to Step S407.

If the UI confirmer 210 confirms that the receiving apparatus includes the setting button 106, in Step S404, the UI confirmer 210 confirms whether the own apparatus includes the setting button 106. If the UI confirmer 210 confirms that the own apparatus includes the setting button 106, in Step S405, the setting mode determiner 209 selects the button pressing mode as the setting mode which the own apparatus activates. If it was found that the own apparatus includes the setting button 106, in Step S405, the setting mode determiner 209 selects the button pressing mode as the setting mode which the own apparatus activates without the confirmation in Step S404. In Step S406, the automatic setting controller 208 uses the wireless communication unit 104 (the packet transmitter 204) to transmit a search response signal in which information indicating the button pressing mode is stored as the mode information to the receiving apparatus. Upon selection of the button pressing mode, the automatic setting controller 208 uses the communication parameter provider 206 to start the setting process of the communication parameters in the button pressing mode. In other words, the process of providing the communication parameters is performed with the receiving apparatus. If the UI confirmer 210 confirms in Step S404 that the own apparatus does not include the setting button 106, the process goes to Step S407.

In Step S407, the UI confirmer 210 confirms the UI information in the search signal to confirm whether the receiving apparatus includes the display unit 105. If the UI confirmer 210 confirms that the receiving apparatus does not include the display unit 105, the process goes to Step S410. If the UI confirmer 210 confirms that the receiving apparatus includes the display unit 105, in Step S408, the UI confirmer 210 confirms whether the own apparatus includes the input unit 109. If the UI confirmer 210 confirms that the own apparatus includes the input unit 109, in Step S409, the setting mode determiner 209 selects the authentication code mode (input side) as the setting mode which the own apparatus activates and the own apparatus functions as the input-side apparatus inputting the authentication code. Upon selection of the authentication code mode as the input-side apparatus, in Step S406, the automatic setting controller 208 uses the wireless communication unit 104 (the packet transmitter 204) to transmit a search response signal in which information indicating the authentication code mode (input side) is stored as the mode information to the receiving apparatus. Upon selection of the authentication code mode (input side), the automatic setting controller 208 uses the communication parameter provider 206 to start the setting process of the communication parameters in the authentication code mode as the input-side apparatus. In other words, the process of providing the communication parameters is performed with the receiving apparatus that selects the authentication code mode as the display-side apparatus. If the UI confirmer 210 confirms in Step S408 that the own apparatus does not include the input unit 109, the process goes to Step S410. If it was found that the own apparatus includes the input unit 109, in Step S409, the setting mode determiner 209 selects the authentication code mode (input side) as the setting mode which the own apparatus activates without the confirmation in Step S408.

In Step S410, the UI confirmer 210 confirms the UI information in the search signal to confirm whether the receiving apparatus includes the input unit 109. If the UI confirmer 210 confirms that the receiving apparatus does not include the input unit 109, the process is erroneously terminated because the receiving apparatus includes neither of the setting button 106, the display unit 105, and the input unit 109. The apparatus that includes neither of the setting button 106, the display unit 105, and the input unit 109 corresponds to a case in which an apparatus in which the display unit 105 and the input unit 109 are removably provided operates as the receiving apparatus in a state in which the display unit 105 and the input unit 109 are removed.

If the UI confirmer 210 confirms in Step S410 that the receiving apparatus includes the input unit 109, in Step S411, the UI confirmer 210 confirms whether the own apparatus includes the display unit 105. If the UI confirmer 210 confirms that the own apparatus does not include the display unit 105, the process goes to Step S413. If the UI confirmer 210 confirms that the own apparatus includes the display unit 105, in Step S412, the setting mode determiner 209 selects the authentication code mode (display side) as the setting mode which the own apparatus activates and the own apparatus functions as the display-side apparatus displaying the authentication code. Upon selection of the authentication code mode as the display-side apparatus, in Step S406, the automatic setting controller 208 uses the wireless communication unit 104 (the packet transmitter 204) to transmit a search response signal in which information indicating the authentication code mode (display side) is stored as the mode information to the receiving apparatus. Upon selection of the authentication code mode (display side), the automatic setting controller 208 uses the communication parameter provider 206 to start the setting process of the communication parameters in the authentication code mode as the display-side apparatus. In other words, the process of providing the communication parameters is performed with the receiving apparatus that selects the authentication code mode as the input-side apparatus. If it was found that the own apparatus includes the display unit 105, in Step S412, the setting mode determiner 209 selects the authentication code mode (display side) as the setting mode which the own apparatus activates without the confirmation in Step S411.

In Step S413, the UI confirmer 210 confirms whether the own apparatus includes the input unit 109. If the UI confirmer 210 confirms that the own apparatus includes the input unit 109, in Step S409, the setting mode determiner 209 selects the authentication code mode (input side) as the setting mode which the own apparatus activates and the own apparatus functions as the input-side apparatus inputting the authentication code. Upon selection of the authentication code mode as the input-side apparatus, in Step S406, the automatic setting controller 208 uses the wireless communication unit 104 (the packet transmitter 204) to transmit a search response signal in which information indicating the authentication code mode (input side) is stored as the mode information to the receiving apparatus. Upon selection of the authentication code mode (input side), the automatic setting controller 208 uses the communication parameter provider 206 to start the setting process of the communication parameters in the authentication code mode as the input-side apparatus. In this case, the process of providing the communication parameters is performed with the receiving apparatus that selects the authentication code mode as the input-side apparatus (the process of providing the communication parameters is performed between the input-side apparatuses). If the UI confirmer 210 confirms in Step S413 that the own apparatus does not include the input unit 109, the process is erroneously terminated because the own apparatus includes neither of the display unit 105 and the input unit 109, the receiving apparatus does not include the setting button 106, and, thus, neither of the authentication code mode and the button pressing mode is performed.

Figure 5:
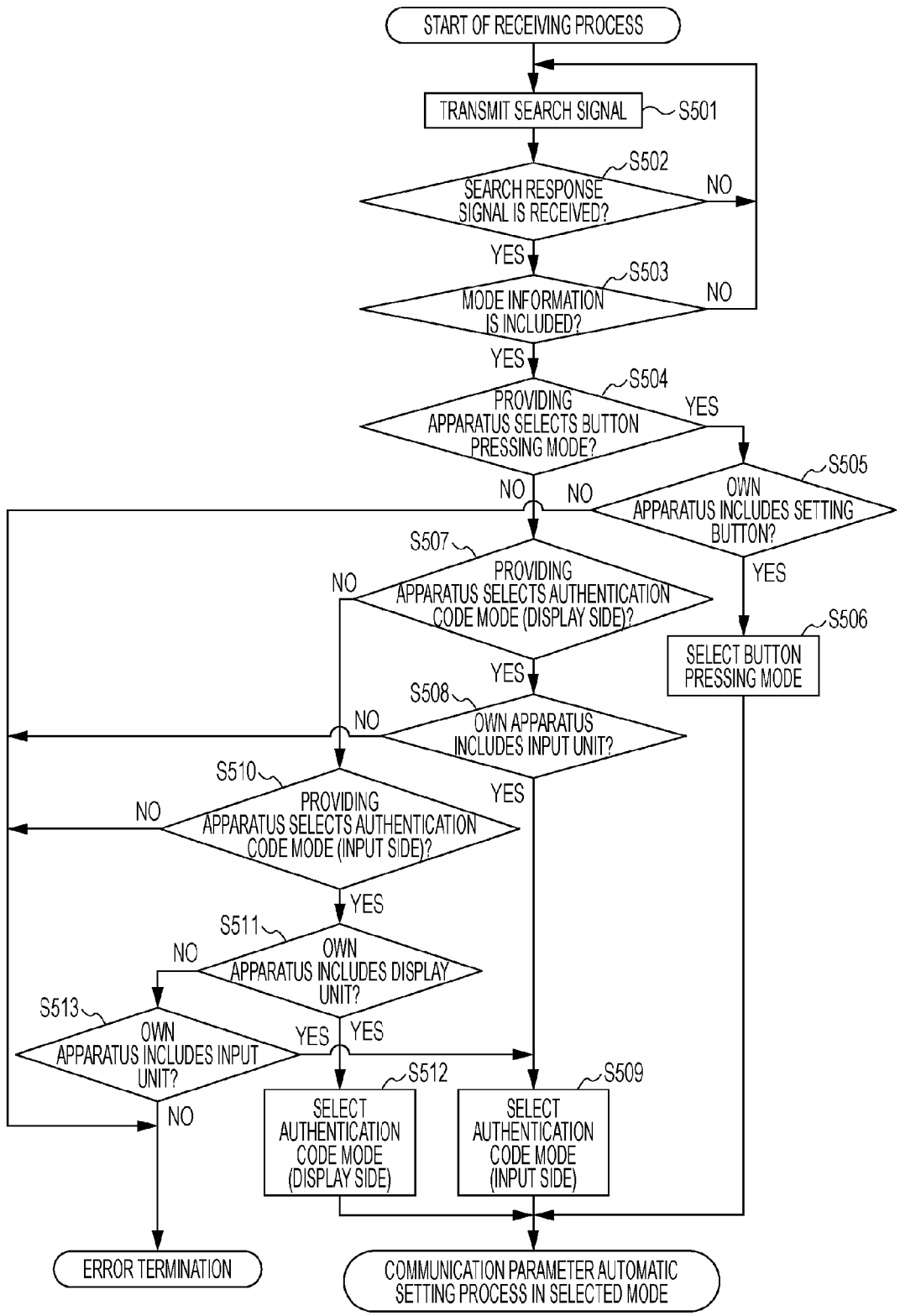
FIG. 5 is a flowchart showing an example of the operation of a receiving apparatus according to an embodiment of the present invention.

FIG. 5 is a flowchart showing an example of a process of determining the setting mode for receiving the communication parameters after the apparatus activates the process of automatically setting the communication parameters as the receiving apparatus. The process of automatically setting the communication parameters may be activated in response to an operation with the setting button 106 or may be activated in response to an operation with the input unit 109. When the process of automatically setting the communication parameters is activated in response to an operation with the setting button 106, the receiving apparatus determines in Step S505 described below that the own apparatus includes the setting button 106. When the process of automatically setting the communication parameters is activated in response to an operation with the input unit 109, the receiving apparatus determines in Steps S508 and S513 described below that the own apparatus includes the input unit 109. The flowchart in FIG. 5 is performed by the control unit 102 that reads out the computer program stored in the storage unit 103 to execute the readout computer program.

Upon start of the operation as the receiving apparatus, in Step S501, the control unit 102 (the automatic setting controller 208) transmits a search signal to search for the providing apparatus with the wireless communication unit 104 (the packet transmitter 204). In Step S502, the control unit 102 (the automatic setting controller 208) determines whether the wireless communication unit 104 (the packet receiver 203) receives a search response signal from the providing apparatus. If the control unit 102 (the automatic setting controller 208) determines that the wireless communication unit 104 (the packet receiver 203) does not receive a search response signal from the providing apparatus, the control unit 102 (the automatic setting controller 208) repeats the transmission of a search signal in Step S501. If the control unit 102 (the automatic setting controller 208) determines that the wireless communication unit 104 (the packet receiver 203) receives a search response signal from the providing apparatus, in Step S503, the control unit 102 determines whether the search response signal includes the mode information. If the control unit 102 determines that the search response signal includes the mode information, the mode confirmer 211 confirms the mode information in the search response signal. In Step S504, the mode confirmer 211 confirms whether the providing apparatus selects the setting process of the communication parameters in the button pressing mode. If the mode confirmer 211 confirms that the providing apparatus does not select the setting process of the communication parameters in the button pressing mode, the process goes to Step S507.

If the mode confirmer 211 confirms that the providing apparatus selects the setting process of the communication parameters in the button pressing mode, in Step S505, the UI confirmer 210 confirms whether the own apparatus includes the setting button 106. If the UI confirmer 210 confirms that the own apparatus includes the setting button 106, in Step S506, the setting mode determiner 209 selects the button pressing mode as the setting mode which the own apparatus activates. Upon selection of the button pressing mode, the automatic setting controller 208 starts the setting process of the communication parameters in the button pressing mode and receives the communication parameters from the providing apparatus with the communication parameter receiver 207. If the UI confirmer 210 confirms in Step S505 that the own apparatus does not include the setting button 106, the process is erroneously terminated because the own apparatus does not support the button pressing mode selected by the providing apparatus. If it was found that the own apparatus includes the setting button 106, in Step S506, the setting mode determiner 209 selects the button pressing mode as the setting mode which the own apparatus activates without the confirmation in Step S505.

In Step S507, the mode confirmer 211 confirms the mode information in the search response signal to confirm whether the providing apparatus selects the setting process of the communication parameters in the authentication code mode (display side). If the mode confirmer 211 confirms that the providing apparatus does not select the setting process of the communication parameters in the authentication code mode (display side), the process goes to Step S510. If the mode confirmer 211 confirms that the providing apparatus selects the setting process of the communication parameters in the authentication code mode (display side), in Step S508, the UI confirmer 210 confirms whether the own apparatus includes the input unit 109. If the UI confirmer 210 confirms that the own apparatus includes the input unit 109, in Step S509, the setting mode determiner 209 selects the authentication code mode (input side) as the setting mode which the own apparatus activates. Upon selection of the authentication code mode (input side), the automatic setting controller 208 starts the setting process of the communication parameters in the authentication code mode with the providing apparatus (display-side apparatus) as the input-side apparatus and receives the communication parameters from the providing apparatus with the communication parameter receiver 207. If the UI confirmer 210 confirms in Step S508 that the own apparatus does not include the input unit 109, the process is erroneously terminated because the own apparatus does not support the authentication code mode (input side), which corresponds to the authentication code mode (display side) which the providing apparatus has selected.

In Step S510, the mode confirmer 211 confirms the mode information in the search response signal to confirm whether the providing apparatus selects the setting process of the communication parameters in the authentication code mode (input side). If the mode confirmer 211 confirms that the providing apparatus does not select the setting process of the communication parameters in the authentication code mode (input side), the process erroneously terminated because the providing apparatus operates in no setting mode or the setting mode of the providing apparatus is not confirmed.

If the mode confirmer 211 confirms in Step S510 that the providing apparatus selects the setting process of the communication parameters in the authentication code mode (input side), in Step S511, the UI confirmer 210 confirms whether the own apparatus includes the display unit 105. If the UI confirmer 210 confirms that the own apparatus does not include the display unit 105, the process goes to Step S513. If the UI confirmer 210 confirms that the own apparatus includes the display unit 105, in Step S512, the setting mode determiner 209 selects the authentication code mode (display side) as the setting mode which the own apparatus activates. Upon selection of the authentication code mode (display side), the automatic setting controller 208 starts the setting process of the communication parameters in the authentication code mode (display side) and receives the communication parameters from the providing apparatus with the communication parameter receiver 207.

In Step S513, the UI confirmer 210 confirms whether the own apparatus includes the input unit 109. If the UI confirmer 210 confirms that the own apparatus includes the input unit 109, in Step S509, the setting mode determiner 209 selects the authentication code mode (input side) as the setting mode which the own apparatus activates. Upon selection of the authentication code mode (input side), the automatic setting controller 208 starts the setting process of the communication parameters in the authentication code mode with the providing apparatus (input-side apparatus) as the input-side apparatus and receives the communication parameters from the providing apparatus with the communication parameter receiver 207. If the UI confirmer 210 confirms in Step S513 that the own apparatus does not include the input unit 109, the process is erroneously terminated because the own apparatus does not include the display unit 105 and the input unit 109 and it is not possible to perform the process of automatically setting the communication parameters in the authentication code mode with the providing apparatus selecting the authentication code mode as the input-side apparatus.

If the communication parameters are provided from the providing apparatus to the receiving apparatus with the processes in FIGS. 4 and 5 and the communication parameters can be shared between the apparatuses, the apparatus A and the apparatus B set the shared communication parameters in the respective wireless communication units 104. Upon setting of the shared communication parameters in the respective wireless communication units 104, the apparatus A and the apparatus B perform the wireless LAN communication by using the shared communication parameters. If the process of automatically setting the communication parameters is performed in the authentication code mode and the input authentication codes do not coincide with each other, the processes are erroneously terminated.

Figure 6:
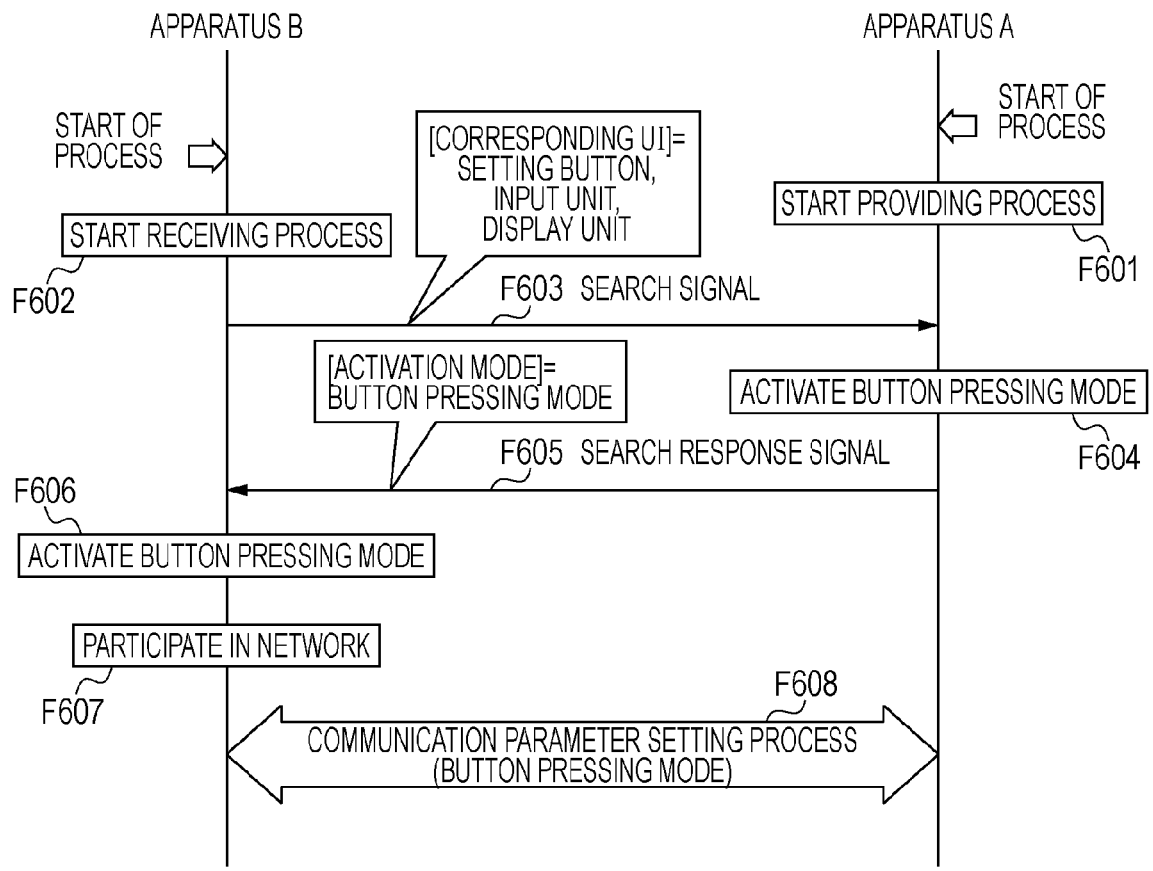
FIG. 6 shows an example of a processing sequence between apparatuses according to an embodiment of the present invention.

FIG. 6 shows an example of a processing sequence when the process of automatically setting the communication parameters is performed between the apparatus A and the apparatus B. In the example in FIG. 6, it is assumed that the apparatus A has activated the process of automatically setting the communication parameters in response to an operation with the setting button 106. The apparatus B may activate the process of automatically setting the communication parameters in response to an operation with the setting button 106 or in response to an operation with the input unit 109.

In response to an operation with the setting button 106 of the apparatus A, for example, in response to pressing of the setting button 106 of the apparatus A, the apparatus A activates the process of automatically setting the communication parameters. After it is determined that the apparatus A functions as the providing apparatus in the process of automatically setting the communication parameters, in F601, the apparatus A starts the operation as the providing apparatus. After the apparatus B activates the process of automatically setting the communication parameters and, then, it is determined that the apparatus B functions as the receiving apparatus in the process of automatically setting the communication parameters, in F602, the apparatus B starts the operation as the receiving apparatus.

In F603, the apparatus B transmits a search signal (probe request) to confirm whether the providing apparatus that is activating the automatic setting process exists around the own apparatus. Here, the self information in the search signal includes information indicating that the apparatus B is operating as the receiving apparatus and the UI information indicating that the apparatus B includes the setting button 106, the input unit 109, and the display unit 105.

In F604, the apparatus A performs the process described above with reference to FIG. 4 upon reception of the search signal from the apparatus B and selects the setting process of the communication parameters in the button pressing mode. In F605, the apparatus A transmits a search response signal to the apparatus B. The self information in the search response signal includes information indicating that the apparatus A is operating as the providing apparatus and information indicating the button pressing mode as the mode information.

In F606, the apparatus B performs the process described above with reference to FIG. 5 upon reception of the search response signal from the apparatus A and selects the setting process of the communication parameters in the button pressing mode. In F607, the apparatus B participates in the network 303 in order to receive the communication parameters. In F608, the process of automatically setting the communication parameters in the button pressing mode is performed between the apparatus A and the apparatus B. As a result, the apparatus B acquires the communication parameters necessary for the communication over the network 303 from the apparatus A in F608.

Figure 7:
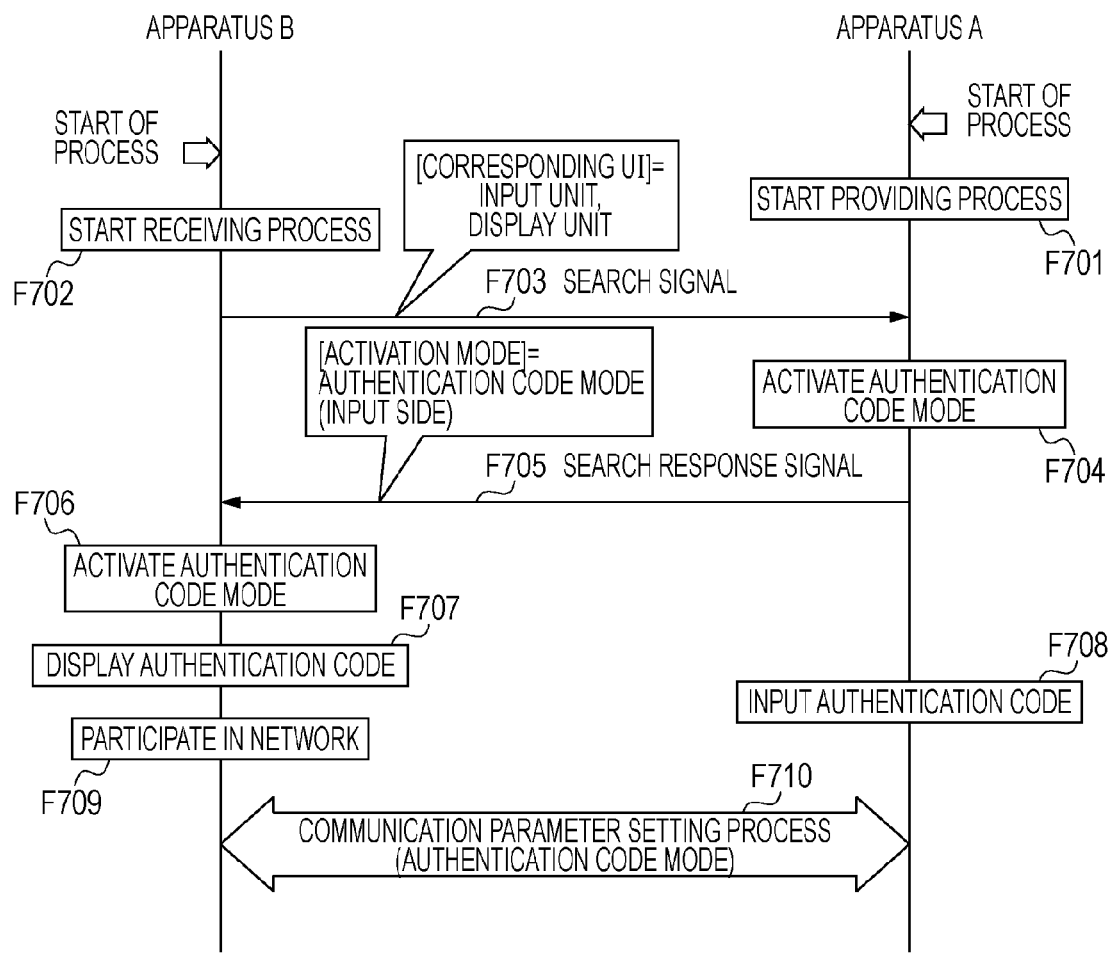
FIG. 7 shows an example of another processing sequence between the apparatuses according to an embodiment of the present invention.

FIG. 7 shows an example of a processing sequence when the process of automatically setting the communication parameters is performed between the apparatus A and the apparatus B in a case where the apparatus B does not include the setting button. In the example in FIG. 7, the apparatus A may activate the process of automatically setting the communication parameters in response to an operation with the setting button 106 or in response to an operation with the input unit 109. It is assumed that the apparatus B has activated the process of automatically setting the communication parameters in response to an operation with the input unit 109.

After the apparatus A activates the process of automatically setting the communication parameters and, then, it is determined that the apparatus A functions as the providing apparatus in the process of automatically setting the communication parameters, in F701, the apparatus A starts the operation as the providing apparatus. After the apparatus B activates the process of automatically setting the communication parameters and, then, it is determined that the apparatus B functions as the receiving apparatus in the process of automatically setting the communication parameters, in F702, the apparatus B starts the operation as the receiving apparatus.

In F703, the apparatus B transmits a search signal (probe request) to confirm whether the providing apparatus that is activating the automatic setting process exists around the own apparatus. Here, the self information in the search signal includes information indicating that the apparatus B is operating as the receiving apparatus and the UI information indicating that the apparatus B includes the input unit 109 and the display unit 105. In F704, the apparatus A performs the process described above with reference to FIG. 4 upon reception of the search signal from the apparatus B and starts the setting process of the communication parameters in the authentication code mode (input side).

In F705, the apparatus A transmits a search response signal to the apparatus B. The self information in the search response signal includes information indicating that the apparatus A is operating as the providing apparatus and information indicating the authentication code mode (input side) as the mode information. In F706, the apparatus B performs the process described above with reference to FIG. 5 upon reception of the search response signal from the apparatus A and starts the setting process of the communication parameters in the authentication code mode (display side). In F707, the apparatus B displays the authentication code in the display unit 105 and prompts the user to input the authentication code in the apparatus A. In F709, the apparatus B participates in the network 303 in order to receive the communication parameters.

In F708, the user of the apparatus A operates the input unit 109 of the apparatus A to input the authentication code displayed in the apparatus B into the apparatus A. If the authentication code displayed in the display unit 105 of the apparatus B coincides with the authentication code input with the operation with the input unit 109 of the apparatus A, in F710, the process of automatically setting the communication parameters is performed between the apparatus A and the apparatus B. As a result, the apparatus B acquires the communication parameters necessary for the communication over the network 303 from the apparatus A in F710.

Although there are a case in which the providing apparatus performs the authentication code mode (display side) and the receiving apparatus performs the authentication code mode (input side) and a case in which both the providing apparatus and the receiving apparatus perform the authentication code mode (input side), in addition to the examples in FIGS. 6 and 7, a description of such cases is omitted herein. It is assumed that the process of automatically setting the communication parameters in the button pressing mode and the authentication code mode conforms to the method described in Non Patent Literature 1. Although the automatic setting of the communication parameters in the infrastructure mode is described in Non Patent Literature 1, this method is applied to the ad hoc mode in the present embodiment.

The setting mode of the automatic setting of the communication parameters is selected in accordance with the UI capabilities of the apparatus A and the apparatus B in the above manner to perform the process of automatically setting the communication parameters in the selected mode.

In the example in FIG. 4, the presence of the setting button 106 is first confirmed (Steps S403 and S404) and, if the setting button 106 is not included, the presence of the input unit 109 and the display unit 105 is confirmed (Steps S407, S408, S410, and S411). However, priority may be given to the confirmation of the presence of the input unit 109 and the display unit 105. This allows the authentication code mode, whose security is higher than that of the button pressing mode, to be performed by priority as the setting mode of the communication parameters.

As described above, when the apparatuses can perform the automatic setting of the communication parameters in the multiple setting modes, it is possible to automatically select the setting mode without the selection of the setting mode by the user to perform the automatic setting of the communication parameters in the selected setting mode, thus improving the user friendliness. In the above embodiments, since the setting mode is selected in accordance with the UI capability of the providing apparatus and the UI capability of the receiving apparatus and the process of automatically setting the communication parameters is performed by using the selected setting mode, it is possible to perform the automatic setting process in accordance with the environment to improve the user friendliness. In addition, since the setting mode is selected in accordance with the UI capabilities of the apparatuses (the apparatus A and the apparatus B) performing the automatic setting process, it is possible to prevent the user from incorrectly selecting the setting mode. Consequently, it is possible to prevent the automatic setting process from erroneously terminating because of the inconsistency of the setting mode.

The wireless LAN conforming to the IEEE 802.11 series is exemplified in the above description, the present invention may be embodied in another wireless medium, such as a Ultra-Wideband (UWB) medium or a medium conforming to wireless universal serial bus (USB), Multi-band Orthogonal Frequency Division Multiplexing (OFDM) Alliance (MBOA), Bluetooth (Registered trademark), or Zigbee. Alternatively, the present invention may be embodied in a wired communication medium, such as a wired LAN. For example, the wireless USB, wireless 1394, and WiNET uses the UWB.

The present invention may be embodied by the following process. Specifically, software (program) realizing the functions of the above embodiments may be supplied to a system or an apparatus over a network or through various storage media and the computer (or CPU or MPU) of the system or apparatus may read out the program to execute the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-242635, filed Oct. 21, 2009, which is hereby incorporated by reference herein in its entirety.

The invention claimed is:

1. A communication apparatus comprising:
a first determining unit configured to determine whether a communication partner apparatus includes a setting button;
a second determining unit configured to determine whether the communication partner apparatus includes at least one of an input unit, which enables a user to input an authentication code, and a display unit which can display an authentication code; and
a sharing unit configured to,
if the first determining unit determines that the communication partner apparatus includes the setting button, share communication parameters with the communication partner apparatus using a first setting mode in which the user presses the setting button, and
if the first determining unit determines that the communication partner apparatus does not include the setting button, share the communication parameters with the communication partner apparatus, based on a result of determination by the second determining unit, using a second setting mode in which the user inputs an authentication code,
wherein the communication parameters are used for communication between the communication apparatus and the communication partner apparatus.

2. The communication apparatus according to claim 1, wherein the sharing unit performs a process for providing the communication parameters to the communication partner apparatus.

3. The communication apparatus according to claim 1, wherein the second setting mode in which the user inputs the authentication code includes a mode in which a user inputs an authentication code into at least one of the communication apparatus and the communication partner apparatus.

4. The communication apparatus according to claim 3, wherein the second setting mode in which the user inputs the authentication code into at least one of the communication apparatus and the communication partner apparatus includes at least one of a mode in which the user inputs the authentication code into one of the communication apparatus and the communication partner apparatus and the authentication code is displayed in the other apparatus and a mode in which the user inputs the authentication code into both the communication apparatus and the communication partner apparatus.

5. The communication apparatus according to claim 1, wherein, if the second determining unit determines that the communication partner apparatus does not include any of the input unit and the display unit, the setting process is terminated as an error.

6. A method of controlling a communication apparatus comprising:
determining whether a communication partner apparatus includes a setting button;
determining whether the communication partner apparatus includes at least one of an input unit, which enables a user to input an authentication code, and a display unit which can display an authentication code; and
sharing, if the first determining unit determines that the communication partner apparatus includes the setting button, share communication parameters with the communication partner apparatus using a first setting mode in which the user presses the setting button, and if the first determining unit determines that the communication partner apparatus does not include the setting button, share the communication parameters with the communication partner apparatus, based on a result of determination by the second determining unit, using a second setting mode in which the user inputs an authentication code,
wherein the communication parameters are used for communication between the communication apparatus and the communication partner apparatus.

7. A non-transitory computer-readable storage medium storing a program causing a computer to function as the communication apparatus according to claim 1.

8. The communication apparatus according to claim 1, further comprising a decision unit configured to decide that the communication apparatus becomes a providing apparatus which provides the communication parameters to a receiving apparatus or the communication apparatus becomes the receiving apparatus which receives the communication parameters from the providing apparatus.

9. The communication apparatus according to claim 1, wherein the determinations by the first determining unit and the second determining unit are performed in a case where the communication apparatus becomes the providing apparatus.

10. The communication apparatus according to claim 1, wherein the determinations by the first determining unit and the second determining unit are performed based on a signal from the communication partner apparatus.

\* \* \* \* \*